(12) United States Patent
Rasheed et al.

(10) Patent No.: US 10,244,342 B1
(45) Date of Patent: Mar. 26, 2019

(54) SPATIALLY REPRESENTING GRAPHICAL INTERFACE ELEMENTS AS BINAURAL AUDIO CONTENT

(71) Applicant: Adobe Systems Incorporated, San Jose, CA (US)

(72) Inventors: Fabin Rasheed, Kerala (IN); Priyanka C. Herur, Bengaluru (IN)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 15/694,807

(22) Filed: Sep. 3, 2017

(51) Int. Cl.
*H04S 7/00* (2006.01)
*H04S 5/00* (2006.01)
*G10L 13/00* (2006.01)
*G06F 3/01* (2006.01)
*G06F 3/16* (2006.01)
*G06F 3/0481* (2013.01)

(52) U.S. Cl.
CPC ............ *H04S 7/303* (2013.01); *G06F 3/0481* (2013.01); *G06F 3/165* (2013.01); *G10L 13/00* (2013.01); *H04S 5/00* (2013.01); *H04S 2400/11* (2013.01); *H04S 2420/01* (2013.01)

(58) Field of Classification Search
CPC ........ H04S 7/303; H04S 5/00; H04S 2400/11; H04S 2420/01; G06F 3/0481; G06F 3/165; G10L 13/00
See application file for complete search history.

(56) References Cited

U.S. PATENT DOCUMENTS

| 5,186,629 A * | 2/1993 | Rohen ..................... G06F 3/016 340/4.12 |
| 5,461,399 A * | 10/1995 | Cragun ................... G06F 3/011 340/4.13 |
| 7,103,841 B2 * | 9/2006 | Ronkainen ............ G06F 3/0481 715/727 |

(Continued)

OTHER PUBLICATIONS

Wersenyi, "Audio representations of a Graphical User Interface for a better Human-Computer interaction", Oct. 25, 2009.*

(Continued)

*Primary Examiner* — David L Ton
(74) *Attorney, Agent, or Firm* — Kilpatrick Townsend & Stockton LLP

(57) ABSTRACT

Certain embodiments involve spatially representing graphical interface elements as binaural audio content. For example, a system accesses electronic content having various content elements and identifies the various content elements. The system generates a three-dimensional audio representation for a content element by: accessing an audio representation of the content element; identifying a visual location of the content element; and generating a three-dimensional audio representation of the content element by applying, to the audio representation of the content element and using the visual location, a finite impulse response filter using a head-related transfer function, wherein the head-related transfer function comprises a set of filter parameters that model the visual location of the content element and wherein, when played, the three-dimensional audio representation appears to originate from the visual location. The system can then output the three-dimensional audio representation.

17 Claims, 3 Drawing Sheets

(56) References Cited

U.S. PATENT DOCUMENTS

| | | | | |
|---|---|---|---|---|
| 2003/0098892 A1* | 5/2003 | Hiipakka | ............... | G06F 3/0481 |
| | | | | 715/846 |
| 2012/0124470 A1* | 5/2012 | West | ..................... | G06F 3/0488 |
| | | | | 715/702 |
| 2014/0215329 A1* | 7/2014 | Zilberman | ............... | G06F 3/167 |
| | | | | 715/702 |

OTHER PUBLICATIONS

Wersenyi, "Effect of emulated head-tracking for reducing localization errors in virtual audio simulation", Nov. 5, 2008.*

Evans, "Mapping an auditory space onto a Graphical User Interface", Mar. 23, 2004.*

Nilsson, Mats E., et al., "Blind People Are More Sensitive Than Sighted People to Binaural Soud-Location Cues, Particularly Inter-Aural Level Differences", Elsevier, Science Direct, Hearing Research, vol. 332, Feb. 2016, 10 pages.

YouTube, "Virtual Reality for Your Ears—Binaural Sound Demo", https://www.youtube.com/watch?v=51za5u3LtEc, Apr. 22, 2016, Accessed Oct. 6, 2017, 3 pages.

Jozuka, Emiko, MotherBoard, "A Blind Legend Uses Binaural Audio to Create a Game for the Visually Impaired", https://motherboard.vice.com/en_us/article/jp5y7g/a-blind-legend-uses-binaural-audio-to-create-a-game-for-the-visually-impaired, Oct. 19, 2015, accessed Oct. 6, 2017, 7 pages.

* cited by examiner

SPATIALLY REPRESENTING GRAPHICAL INTERFACE ELEMENTS AS BINAURAL AUDIO CONTENT

TECHNICAL FIELD

This disclosure generally relates to accessibility tools and more specifically relates to accessibility tools for spatially representing graphical interface elements as binaural audio content.

BACKGROUND

Accessibility tools offer audio read-back of interfaces. In some instances, accessibility tools can allow a user to access or use information and technology that may otherwise be inaccessible to the user. For example, accessibility tools that offer audio read-back interfaces can convert content or an element (e.g., text) displayed via a display device to speech, which can allow a visually impaired user to interact with the content or perceive the content displayed on the display device. As an example, a visually impaired user can interact with content via a mouse or keyboard (e.g., move a cursor to a position of the content) and the accessibility tool can convert the content to speech and provide an audio representation of the content (e.g., audio feedback that reads the content to the user).

Current solutions for the audio being played back from such frameworks are monaural. For example, current monaural audio systems can provide audio representations of an element via a single speaker or multiple speakers. In this example, identical audio signals are provided to each speaker via the same audio channel. Therefore, existing monaural audio systems provide audio representations that do not convey a perception or sensation of a location, depth, or position of the sound source, which can create the impression that all audio content comes from a particular point. Thus, two different audio representations of two different elements would be perceived by a user as originating from the same point in a space.

Existing accessibility tools therefore provide an experience that is one-dimensional from a user's perspective. As a result, an impaired user may not experience a three-dimensional auditory sensation as compared to a user that is not impaired.

SUMMARY

Various embodiments of the present disclosure provide systems and methods for spatially representing graphical interface elements as binaural audio content.

In one example, a method for spatially representing graphical interface elements as binaural audio content includes: accessing, by a processor, electronic content having a plurality of content elements; identifying, by the processor, the plurality of content elements of the electronic content; and generating, by the processor, a three-dimensional audio representation for a content element of the plurality of content elements. Generating the three-dimensional audio representation includes: accessing an audio representation of the content element; identifying a visual location of the content element; and generating a three-dimensional audio representation of the content element by applying, to the audio representation of the content element and using the visual location, a finite impulse response filter using a head-related transfer function, wherein the head-related transfer function comprises a set of filter parameters that model the visual location of the content element and wherein, when played, the three-dimensional audio representation appears to originate from the visual location. The method further includes outputting, by the processor, the three-dimensional audio representation such that the three-dimensional audio representation is accessible to a user device that displays the electronic content.

Additional features and advantages of exemplary embodiments of the present disclosure will be set forth in the description which follows, and in part will be obvious from the description, or will be learned by the practice of such exemplary embodiments. The foregoing summary is not an extensive overview, and it is not intended to identify key elements or indicate a scope. Rather the foregoing summary identifies aspects of embodiments as a prelude to the detailed description presented below.

DETAILED DESCRIPTION

Figure 1:
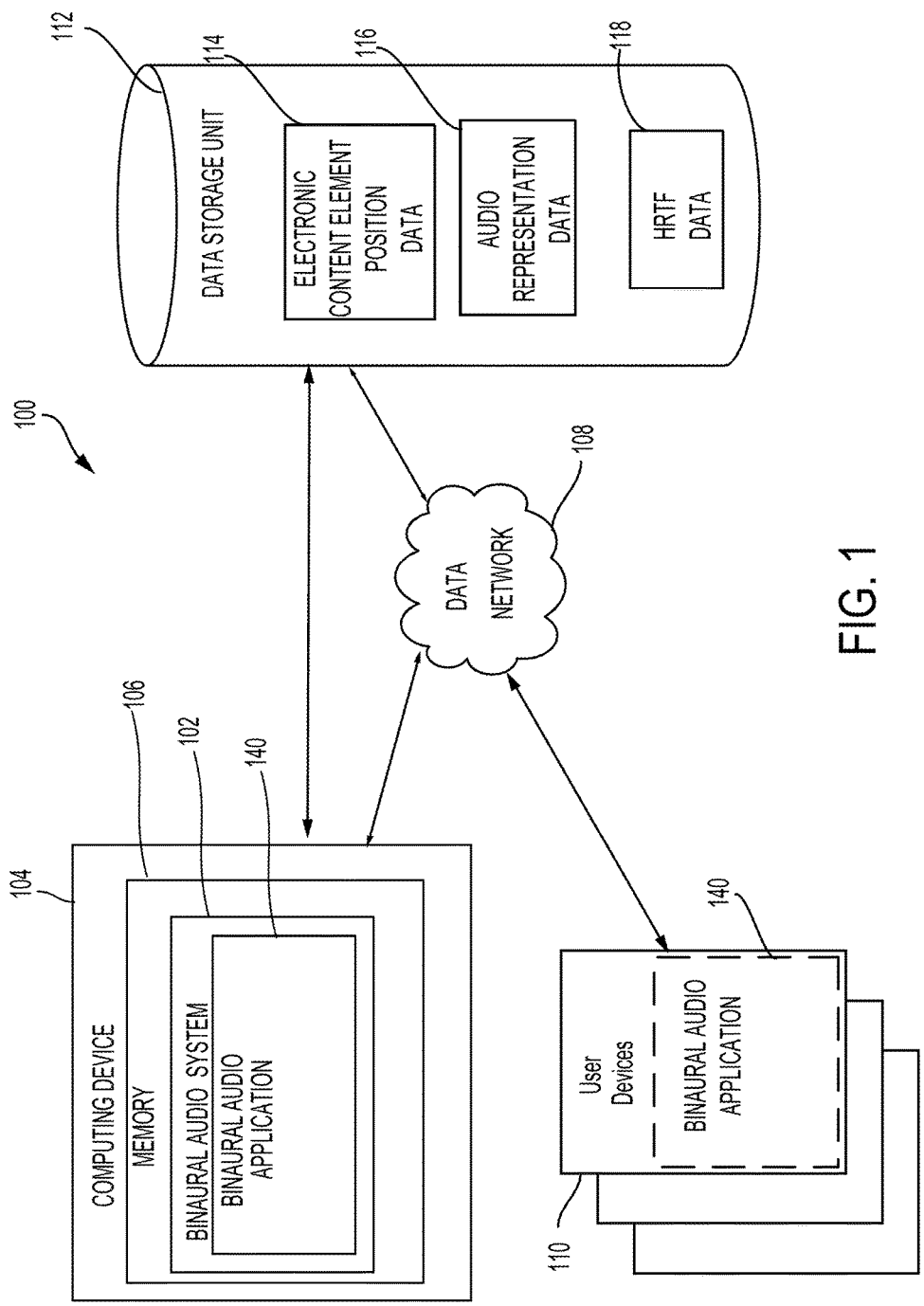
FIG. 1 is a block diagram of an exemplary environment in which a binaural audio system generates binaural and spatial audio representations of electronic content elements in accordance with one or more embodiments.

Embodiments described herein include binaural audio applications and systems that spatially represent graphical interface elements as binaural audio content. A binaural audio application generates sound cues that represent the locations of elements in a graphical interface. For example, if an "edit" menu is located on the upper right-hand side of a graphical interface, the binaural audio application generates a corresponding sound cue by playing an audio recording of the word "edit" for a user (e.g., when the user moves a cursor near the "edit" menu or otherwise interacts with the "edit" menu via user input). The sound cue is generated such that, from the perspective of the user, the audio source sounds as if it is positioned at a location to the right of and above the user's head (e.g., the user can perceive the sound as originating from a location corresponding to the location of the "edit" menu in the graphical interface). In this manner, an element of the graphical interface is aurally represented in three dimensions. Thus, the binaural audio application provides improved accessibility by allowing a sight-impaired user to more easily distinguish between audio representations of interface elements.

The following non-limiting example is provided to introduce certain embodiments. A binaural audio application accesses a web document to be augmented with three-dimensional sound cues. The binaural audio application scans the web document and thereby identifies various document elements (e.g., menus, buttons, text, etc.). The binaural audio application determines a location of each document element as displayed on the web document. The binaural audio also generates, for each document element, a corresponding audio representation. For example, if a document element includes text, the binaural audio application executes a text-to-speech engine to generate a corresponding audio representation. In some examples, each document element is associated with a placeholder (e.g., a textual description of the element). In this example, the binaural audio application scans the web document and identifies a placeholder associated with each identified document element. The placeholder can then be converted to an audio representation of the document element by executing a text-to-speech algorithm. To generate a binaural and spatial audio representation of the web document, the binaural audio application applies a finite impulse response ("FIR") filter to each audio representation using a head-related transfer function ("HRTF"). The FIR filter can include one or more algorithms that can be applied to an audio signal or representation to generate one or more three-dimensional audio signals or sounds, which when played, cause the three-dimensional audio signal or sound to appear to originate from a source at a particular aural location with respect to the user (e.g., above and to the right, below and to the left, behind and to the right, etc.). Each HRTF is configured with parameters that cause the aural location of a particular document element to correspond to the visual location of the particular document element (e.g., the location of the document element as displayed on the web document).

Continuing with this example, the binaural audio application augments the web document by adding three-dimensional audio accessibility content to the web document. For example, the binaural audio application augments the web document by associating each identified document element with a corresponding generated three-dimensional audio signals or sounds, which allows the web document to be aurally modeled to a user if the web document is displayed in a graphical interface. For instance, a web browser or other end-user application that displays the web document can have an accessibility function used by visually impaired users. If the augmented web document is accessed, the accessibility function retrieves the audio accessibility content (e.g., generated three-dimensional audio signals associated with each identified document element of the web document). Each three-dimensional signal is played if a particular document element is highlighted, selected, or otherwise indicated by a user input by outputting corresponding binaural audio signals.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

As used herein, the term "audio representation" is used to refer to any audio value, audio signal, sound, or audio file.

FIG. 1 is a block diagram of an exemplary environment 100 in which a binaural audio system 102 generates binaural and spatial audio representations of electronic content elements in accordance with one or more embodiments. The environment 100 includes the binaural audio system 102, one or more computing devices 104, and one or more data storage units 112. The binaural audio system 102, the computing devices 104, and the data storage unit 112 are communicatively coupled via one or more data networks 108 (e.g., the Internet, one or more local area networks ("LAN"), one or more wired area networks, or some combination thereof).

In some embodiments, a user of the computing device 104 visits a webpage or an application store to explore applications supported by the binaural audio system 102. The binaural audio system 102 provides the applications as a software as service ("SaaS"), or as a standalone application that may be installed on the computing device 104, or as a combination.

In some embodiments, the computing device 104 represents various types of client devices. For example, the computing device 104 is a mobile device (e.g., a mobile telephone, a smartphone, a PDA, a tablet, a laptop, a camera, a tracker, a watch, a wearable device, etc.). The computing device 104, however, in some embodiments, is a non-mobile device (e.g., a desktop computer or another type of client device). In this example, the binaural audio system 102 is implemented on, executed by, or stored on one or more computing devices 104. For example, the binaural audio system 102 is stored on a memory device 106 of the computing device 104. In some embodiments, the binaural audio system 102 is executed on the one or more computing devices 104 via a binaural audio application 140.

In some embodiments, the binaural audio system 102 includes the binaural audio application 140, which can include one or more instructions stored on a computer-readable storage medium and executable by one or more processors of the computing device 104. When executed by the one or more processors, the computer-executable instructions of the binaural audio application 140 cause the binaural audio system 102 to generate binaural and spatial audio representations of electronic content elements.

For example, a user of the computing device 104 accesses electronic content via the computing device 104. The electronic content can include, or be a part of, a graphical user interface displayed via a display device. Electronic content can include, but is not limited to, a webpage, website, or any electronic content (e.g., text, images, videos, animations, documents, user interfaces, etc.) In some embodiments, the electronic content includes various electronic content elements (e.g., menus, buttons, text, images, etc.).

In some embodiments, the binaural audio application 140 causes the binaural audio system 102 to access the electronic content and scan the electronic content to identify one or more electronic content elements. For example, the binaural audio system 102 accesses a webpage accessed by the user and scans the webpage to identify text, menus, buttons, or any graphical interface element of the webpage. In some embodiments, each electronic content element in the electronic content is associated with a placeholder such as, for example, a textual description or representation of the electronic content element. In this example, the binaural audio application 140 causes the binaural audio system 102 to scan the electronic content and identify one or more electronic content elements and a placeholder associated with each identified electronic content element.

The binaural audio application 140 causes the binaural audio system 102 to determine a position or location of an identified electronic content element. In some examples, the binaural audio system 102 determines a position or location of an electronic content element as displayed in the electronic content or as displayed in a graphical user interface that includes the electronic content. For example, the binaural audio system 102 identifies text on a webpage and identifies a visual location or position of the text as displayed on the webpage or a graphical user interface that includes the webpage. In some embodiments, the position or location of an electronic content element is an azimuth and/or elevation value or position of the electronic content element. An azimuth value or position can correspond to a position on a horizontal plane and an elevation value or position can correspond to a position on a vertical plane. In some embodiments, the binaural audio system 102 determines a position or location of an electronic content element by accessing the data storage unit 112, another database, or an electronic content object model that includes data indicating a location or position of an electronic content element as displayed in the electronic content or as displayed in a graphical user interface that includes the electronic content. As an example, the binaural audio system 102 determines a position or location of text on a webpage by accessing a document object model ("DOM") that indicates a structure of the webpage such as, for example, positions of text and other content on the webpage and determining the position or location of the text on the webpage from the DOM. As another example, the data storage unit 112 includes electronic content element position data 114 that indicates position or location data associated with various electronic content elements and the binaural audio system 102 obtains or receives a position or location of an identified electronic content element from the data storage unit 112.

In some embodiments, the binaural audio application 140 causes the binaural audio system 102 to access an audio representation of an identified electronic content element. An audio representation associated with an electronic content can include an audio signal or a sound that, when played, indicates the electronic content element. In some embodiments, the binaural audio application 140 causes the binaural audio system 102 to access an audio representation of an electronic content element from the data storage unit 112 or any other source. For example, the data storage unit 112 stores audio representation data 116 that indicates various audio representations associated with various electronic content elements and the binaural audio system 102 obtains or receives an audio representation of an identified electronic content element from the data storage unit 112. As an example, if an electronic content element includes text, the binaural audio system 102 obtains or receives an audio representation of the text from the data storage unit 112. As another example, the electronic content is associated with a placeholder such as, for example, a textual description or representation of the electronic content element and the audio representation data 116 indicates various audio representations associated with various placeholders. In this example, the binaural audio system 102 obtains or receives an audio representation associated with a placeholder of an electronic content element from the data storage unit 112. In some embodiments, the binaural audio application 140 causes the binaural audio system 102 to generate an audio representation of an identified electronic content element. As an example, the electronic content is associated with a placeholder and the binaural audio application 140 causes the binaural audio system 102 to use one or more text-to-speech algorithms to generate an audio representation of the electronic content element based on the placeholder. For example, the binaural audio system 102 uses the one or more text-to-speech algorithms or engines to convert a textual description or representation of the electronic element to an audio representation (e.g., audio file, audio value, etc.).

In some embodiments, the binaural audio application 140 causes the binaural audio system 120 to generate a binaural and spatial audio representation of an identified electronic content element based on the audio representation of the electronic content element. In some examples, a binaural and spatial audio representation of an electronic content element is a three-dimensional audio representation of the electronic content element. The three-dimensional audio representation can convey a perception or sensation of a location, depth, or position of the electronic content element. For example, the three-dimensional audio representation of an electronic content element can convey a position or location of the electronic content element as displayed in the electronic content or as displayed in a graphical user interface that includes the electronic content such that, when played, the three-dimensional audio representation is perceived by a user of the computing device 104 as originating from the position or location of the electronic content element.

In some embodiments, the binaural audio application 140 causes the binaural audio system 120 to generate a binaural and spatial audio representation of an electronic content element by applying a finite impulse response ("FIR") filter to an audio representation of the electronic content element using a head-related transfer function ("HRTF"). The FIR filter can include one or more algorithms that can be applied to an audio signal or representation to generate one or more binaural and spatial audio representations, which when played, cause the binaural and spatial audio representation to appear to originate from a source at a particular aural location with respect to the user (e.g., above and to the right, below and to the left, behind and to the right, etc.). In some embodiments, the HRTF is configured with one or more parameters or functions associated with a location or position (e.g., azimuth or elevation positions). The parameter or function of the HRTF can model a location or position and can be used to modify an audio signal or representation to generate a binaural and spatial audio representation that, when played, can be perceived as originating from the particular location or position. In some embodiments, the binaural audio system 102 can generate a binaural audio representation of an electronic content element by applying the FIR filter to an audio representation of the electronic content element using a parameter or function associated with a location or position of the electronic content element. When played, the binaural audio representation of the electronic content element can be perceived as originating from the visual location of the electronic content element (e.g., the location or position of the electronic content element as displayed in the electronic content or as displayed in a graphical user interface that includes the electronic content).

In some embodiments, the data storage unit 112 includes HRTF data 118, which indicates various parameters or functions associated with various locations (e.g., azimuth or elevation positions). In this example, the binaural audio system 102 can obtain or receive HRTF data 118 associated with a position or location of an identified electronic content element and apply a FIR filter to the audio representation of the identified electronic content using the HRTF data 118 to generate a binaural and spatial audio representation of the electronic content.

In some embodiments, the binaural audio application 140 causes the binaural audio system 120 to augment the electronic content with generated binaural and spatial audio representations of various electronic content elements. For example, the binaural audio system 120 augments the electronic content by associating each identified electronic content element with a corresponding generated binaural and spatial audio representation. In this example, the binaural audio application 140 can cause the binaural audio system 120 to output one or more of the generated binaural and spatial representations, which can allow the electronic content to be aurally modeled to a user if the electronic content is displayed in a graphical interface via the computing device 104.

For instance, the user of the computing device 104 accesses the electronic content via a web browser or other end-user application using the computing device 104. The computing device 104, the web browser, or end-user application can include an accessibility tool or function used by visually impaired users. In this example, when the user accesses the electronic content and/or provides user input accessing the accessibility tool or function, the binaural audio system 120 retrieves audio accessibility content (e.g., the generated binaural and spatial audio representations associated with various electronic content elements of the electronic content). Each binaural and spatial audio representations is played if a particular electronic content element is highlighted, selected, or otherwise indicated by a user input by outputting the corresponding binaural and spatial audio representation.

In some embodiments, the computing device 104 can include one or more sensors that can detect a direction of the user's field of view with respect to electronic content or electronic content elements displayed via the computing device 104. The sensor can include a camera or be incorporated into a camera. The sensor can be configured to capture an image of the eye of the user and the binaural audio application 140 can cause the binaural audio system 102 to determine the direction of the field of view of the user relative to the electronic content based at least in part on the image by using various image processing methods and techniques. In another embodiment, the one or more sensors can be configured to monitor movements of an eye of the user or muscles near an eye of the user of the computing device 104 and the binaural audio system 102 can determine the direction of the user's field of view relative to electronic content based at least in part on the monitored movements. In still another embodiment, the sensor may be configured to monitor or measure electrical activity of muscles moving the eye of the user of the computing device 104 and the binaural audio system 102 can be configured to determine the direction of the user's field of view relative to the electronic content displayed via the computing device 104. In some embodiments, the sensor may detect the user's eye gaze, line-of sight, or field of view through various methods and techniques, including, for example, analyzing the user's body or head posture. As an example, the sensor can include a head-mounted display or a head-mounted sensor for detecting a motion of the user's head or for detecting the user's head posture and transmitting data about the motion of the user's head or data about the user's head posture to the binaural audio system 102, which can determine the direction of the field of view of the user of the computing device 104 based on the data.

In some examples, the binaural audio application 140 can cause the binaural audio system 120 to output one or more generated binaural and spatial representations in response to determining that the user of the computing device 104 is looking at, or in the direction of, a particular electronic content element. For example, if the user is looking at text on a webpage, the binaural audio system 102 can output a corresponding binaural and spatial audio representation. In this manner, the binaural audio system 102 can generate and output binaural and spatial audio based on a direction of a field of view of a user of the computing device 104.

In the example depicted in FIG. 1, a user can interface with the one or more user devices 110 to access the binaural audio system 102. In some embodiments, each of the user devices 110 represents various types of client devices. For example, the user device 110 is a mobile device (e.g., a mobile telephone, a smartphone, a PDA, a tablet, a laptop, a camera, a tracker, a watch, a wearable device, etc.). The user device 110, however, in some embodiments, is a non-mobile device (e.g., a desktop computer or another type of client device). In some embodiments, the binaural audio system 102 is executed on the one or more user devices 110 via a binaural audio application 140. In this example, the user device 110 includes one or more components of the binaural audio system 102.

Although the exemplary environment 100 of FIG. 1 is depicted as having a certain number of components, in other embodiments, the exemplary environment 100 has any number of additional or alternative components. Further, while FIG. 1 illustrates a particular arrangement of the computing device 104, the binaural audio system 102, user devices 110, and the data storage unit 112, various additional arrangements are possible. As an example, while FIG. 1 illustrates data storage unit 112 and the binaural audio system 102 as part of separate systems, in some embodiments, the data storage unit 112 and the binaural audio system 102 are part of a single system.

Figure 2:
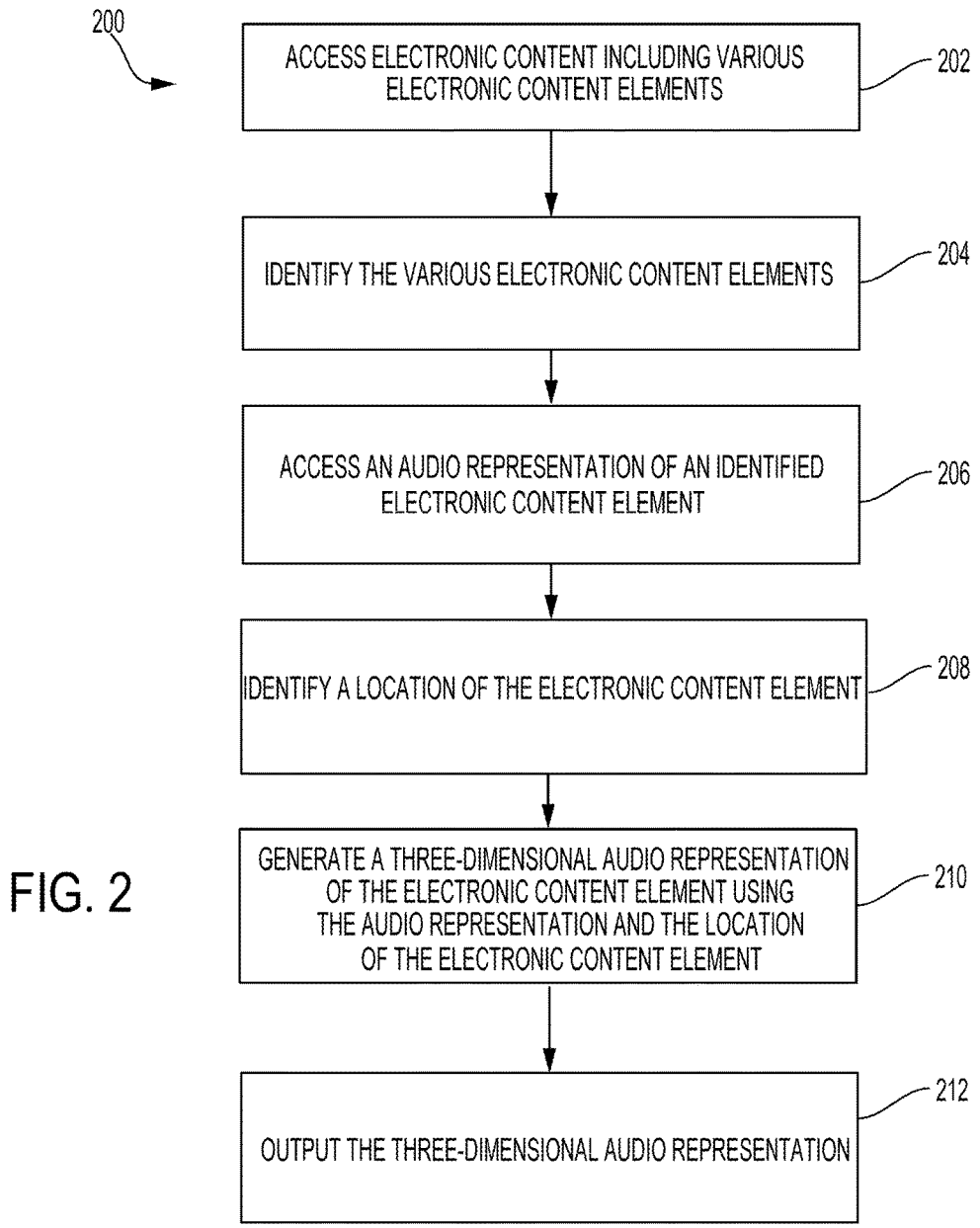
FIG. 2 is a flow chart depicting an example of a process for generating binaural and spatial audio representations of electronic content elements in accordance with one or more embodiments.

FIG. 2 is a flow chart depicting an example of a process for generating binaural and spatial audio representations of electronic content elements in accordance with one or more embodiments. In some embodiments, one or more processing devices such as, for example, the computing system described herein with respect to FIG. 3, implement operations depicted in FIG. 2 by executing suitable program code (e.g., the binaural audio system 102 of FIG. 1) that implements one or more algorithms encompassed by the process 200. For illustrative purposes, the process 200 is described with reference to the examples depicted in FIG. 1, but other implementations are possible.

In block 202, electronic content that includes various electronic content elements is accessed. For example, a user of a computing device 104 accesses electronic content via the computing device 104. The electronic content can include, or be a part of, a graphical user interface displayed via a display device. Electronic content can include, but is not limited to, a webpage, website, or any electronic content (e.g., text, images, videos, animations, documents, user interfaces, etc.) In some embodiments, the electronic content includes various electronic content elements (e.g., menus, buttons, text, images, icons, etc.).

In some embodiments, a binaural audio system 102 is implemented on, executed by, or stored on the computing device 104. In some embodiments, the binaural audio system 102 includes a binaural audio application 140, which can include one or more instructions stored on a computer-readable storage medium and executable by processors of the computing device 104. When executed by the one or more processors, the computer-executable instructions of the binaural audio application 140 can cause the binaural audio system 102 to access the electronic content accessed by the user.

In block 204, the various electronic content elements of the electronic content are identified. In some embodiments, the binaural audio application 140 causes the binaural audio system 102 to access the electronic content and scan the electronic content to identify one or more electronic content elements. For example, if the electronic content is a webpage accessed by a user of the computing device 104, the binaural audio system 102 accesses the webpage and scans the webpage to identify text, menus, buttons, or any graphical interface elements of the webpage. In some embodiments, the binaural audio system 102 can identify one or more electronic content elements by accessing a database, a model, or any other source that includes data indicating the electronic content elements included in the electronic content element and identifying the electronic content elements.

In some embodiments, an electronic content element in the electronic content is associated with a placeholder such as, for example, a textual description or representation of the electronic content element. In some examples, the binaural audio system 102 can obtain or receive data indicating a placeholder associated with an electronic content element from the electronic content (e.g., if the data is embedded within the electronic content), the data storage unit 112, another computing device, user input (e.g., if a user programs the binaural audio system 102 to include the data), or any other source. In this example, the binaural audio application 140 causes the binaural audio system 102 to scan the electronic content, identify one or more electronic content elements, and obtain data indicating a placeholder associated with each identified electronic content element.

In block 206, an audio representation of an identified electronic content element is accessed. In some embodiments, the binaural audio application 140 causes the binaural audio system 102 to access the audio representation of the electronic content element. The audio representation of the electronic content element can include an audio signal, audio value, or sound that indicates the identified electronic content element. As an example, if the electronic content element includes text, the audio representation can include an audio signal or value that, when played, corresponds to the text.

In some embodiments, the binaural audio application 140 causes the binaural audio system 102 to access the audio representation from the data storage unit 112 or any other source. As an example, the data storage unit 112 includes audio representation data 116 that indicates various audio representations associated with various electronic content elements. The binaural audio system 102 accesses the audio representation data 116 and obtains the audio representation associated with the identified electronic content element. In another example, the binaural audio system 102 receives data indicating an audio representation associated with the identified content element from the data storage unit 112. In some embodiments, the electronic content is associated with a placeholder (e.g., a textual representation or description of the electronic content element). In this example, the binaural audio application 140 causes the binaural audio system 102 to access an audio representation associated with the placeholder of the electronic content. For example, the audio representation data 116 indicates various audio representations associated with various placeholders of electronic content elements and the binaural audio system 102 obtains or receives the audio representation associated with the placeholder of the identified electronic content element from the data storage unit 112.

In some embodiments, the binaural audio application 140 causes the binaural audio system 102 to generate an audio representation of an identified electronic content element. For example, the identified electronic content is associated with a placeholder such as, for example, a textual representation of the electronic content element, and the binaural audio application 140 causes the binaural audio system 102 to use one or more text-to-speech algorithms to generate an audio representation of the electronic content element. For example, the binaural audio system 102 uses the one or more text-to-speech algorithms to convert the textual description or representation of the electronic element to an audio representation (e.g., audio file, audio value, etc.).

In block 208, a location of the identified electronic content element is identified. In some embodiments, the binaural audio application 140 causes the binaural audio system 102 to identify the location or position of the electronic content element. The location of the electronic content element can correspond to a position or location of the electronic content element as displayed in the electronic content or as displayed in a graphical user interface. For example, the location of the electronic content element can correspond to a visual location of the electronic content element such as, for example, a visual location of a menu or text within a webpage or within a graphical user interface displaying the webpage. In some embodiments, the binaural audio system 102 determines the position or location of the electronic content element by determining an azimuth (e.g., horizontal) and/or elevation (e.g., vertical) value or position of the electronic content element.

In some embodiments, the binaural audio system 102 determines a position or location of the electronic content element by accessing a database or an electronic content object model that includes data indicating locations or positions of one or more electronic content elements as displayed in the electronic content or as displayed in a graphical user interface that includes the electronic content. As an example, the binaural audio system 102 determines a position or location of text on a webpage by accessing a document object model ("DOM") that indicates a structure of the webpage such as, for example, positions of text and other content on the webpage and determining the position or location of the text on the webpage. As another example, the data storage unit 112 includes electronic content element position data 114 that indicates position or location data associated with various electronic content elements and the binaural audio system 102 obtains or receives the position or location of the electronic content element from the data storage unit 112.

In some embodiments, the binaural audio system 102 determines the position or location of the electronic content element based on a graphical user interface that includes the electronic content element or a display device via which electronic content is output. For example, the binaural audio system 102 determines a size or dimension of the graphical user interface and determines a position of the electronic content element relative to the size or dimension of the graphical user interface. As an example, the binaural audio system 102 determines dimensions of the graphical user interface and determines a position of the electronic content element relative to a top, bottom, left, or right border or boundary of the graphical user interface. In this example, the binaural audio system 102 uses the relative position of the electronic content element to determine a relative azimuth and/or relative elevation value or position of the electronic content element with regard to the graphical user interface. In some examples, the binaural audio system 102 determines a position or location of the electronic content element based on a display device of the computing device 104 via which the electronic content is output in substantially the same manner as described above. For example, the binaural audio system 102 obtains data indicating a size or dimensions of the display device and determines a position of the electronic content element relative to a top, bottom, left, or right border or boundary of the display device and uses the relative position of the electronic content element to determine a relative azimuth and/or relative elevation value or position of the electronic content element with regard to the display device.

In block 210, a three-dimensional audio representation of the electronic content element is generated. In some embodiments, the binaural audio application 140 causes the binaural audio system 102 to generate the three-dimensional audio representation of the electronic content element using the audio representation of the electronic content element (e.g., the audio representation accessed in block 206) and the location of the electronic content element (e.g., the location determined in block 208). The three-dimensional audio representation of the electronic content element can be a binaural and spatial audio representation that can convey a perception or sensation of a location, depth, or position of the electronic content element (e.g., the location or position of the electronic content element identified in block 208). For example, if the electronic content includes text located toward the left on a webpage, the three-dimensional the binaural audio system 102 generates an audio representation of the text that, when played, is perceived by a user as originating from the left of the webpage.

In some embodiments, the binaural audio application 140 causes the binaural audio system 120 to generate the three-dimensional audio representation of the electronic content element using various methods or techniques. For example, the binaural audio system 102 generates the three-dimensional audio representation by applying a FIR filter to the audio representation of the electronic content element (e.g., the audio representation accessed or generated in block 206). The binaural audio system 102 can use a HRTF to apply the FIR filter to the audio representation of the electronic content element to generate the three-dimensional audio representation. The HRTF and/or FIR filter can use one or more algorithms or functions that can be applied to an audio signal, audio value, or audio representation to generate or synthesize a three-dimensional audio representation that, when played, can be perceived by a user as originating or coming from a particular point in space.

In some embodiments, the HRTF includes one or more parameters or functions that can be used to generate or synthesize the three-dimensional audio representation. The one or more parameters or functions can be based on a location or position such that the parameters or functions can be used to generate a three-dimensional audio representation that when played, the three-dimensional audio representation can be perceived as originating from the visual location of the electronic content element (e.g., the location or position of the electronic content element as displayed in the electronic content or as displayed in a graphical user interface that includes the electronic content).

In some embodiments, the binaural audio system 102 obtains or receives HRTF data 118 from the data storage unit 112 for generating the three-dimensional audio representation of the electronic content element. The HRTF data 118 can include data that indicates various parameters or functions associated with various locations or positions (e.g., azimuth or elevation positions). In this example, the binaural audio system 102 can obtain or receive HRTF data 118 associated with the position or location of the electronic content element and apply a FIR filter to the audio representation of the electronic content to generate the three-dimensional audio representation of the electronic content. In another example, the binaural audio system 102 can obtain or receive HRTF data 118 from any other source.

In some embodiments, the binaural audio system 102 determines the position or location of the electronic content element relative to the position or location of another electronic content element and generates a three-dimensional audio representation of each of the electronic elements based on the relative position or location of the electronic content element.

For example, the electronic content includes a first electronic content element, a second electronic content element, and a third electronic content element. The binaural audio system 102 determines a position or location of each of the first, second, and third electronic content elements and compares the position or location of the electronic content elements to determine a relative location or position of each electronic content element. As an example, the binaural audio system 102 compares a location of the first electronic content element and a location of the second electronic content element and determines a distance between the first and second electronic content elements. The binaural audio system 102 also compares a location of the first electronic element and a location of the third electronic element and determines a distance between the first and third electronic elements. In this example, the binaural audio system 102 compares the distance between the first and second electronic elements and the distance between the first and third electronic elements and determines that the distance between the first and second electronic elements is greater than the distance between the first and third electronic elements (e.g., the first electronic element is closer to the third electronic element than the second electronic element). The binaural audio system 102 can generate a three-dimensional audio representation of each of the first, second, and third electronic content elements based on the relative position of each electronic content element. For example, when the three-dimensional audio representations of each of the first, second, and third electronic content elements are played, the three dimensional-audio representation of the first electronic content element is perceived as originating from a location that is close to a location from which the three-dimensional audio representation of the third electronic content element originates.

In block 212, the three-dimensional audio representation is output. In some embodiments, the binaural audio application 140 causes the binaural audio system 120 to output the three-dimensional audio representation.

For example, the binaural audio application 140 causes the binaural audio system 120 to augment the electronic content with the generated three-dimensional audio representation of the electronic content element (e.g., the three-dimensional audio representation generated in block 210). In some embodiments, the binaural audio application 140 augments the electronic content element by associating an identified electronic content element (e.g., an electronic content element identified in block 204) with a corresponding generated three-dimensional audio representation, which can allow the electronic content to be aurally modeled for a user when the electronic content is displayed in a graphical interface via the computing device 104.

For instance, the user of the computing device 104 accesses the electronic content via a web browser or other end-user application using the computing device 104. The computing device 104, the web browser, or end-user application can include an accessibility tool or function used by visually impaired users. In this example, when the user accesses the electronic content and/or provides user input accessing the accessibility tool or function, the binaural audio system 120 retrieves a generated three-dimensional audio representation associated with an electronic content element (e.g., the three-dimensional audio representation generated in block 210) and outputs the three-dimensional audio representation if the electronic content element is highlighted, selected, or if the user provides any user input to interact with the electronic content element (e.g., moves a cursor near the electronic content element, provides touch input near the electronic content element etc.). Outputting the three-dimensional audio representation of the electronic content element can convey a position or location of the electronic content element as displayed in the electronic content or as displayed in a graphical user interface that includes the electronic content. For example, when played, the three-dimensional audio representation of the electronic content element is perceived by a user of the computing device 104 as originating from the position or location of the electronic content element.

In some embodiments, in block 212, the binaural audio application 140 causes the binaural audio system 120 to output the three-dimensional audio representation based on a direction of a field of view of the user of the computing device 104. For example, the binaural audio application 140 can cause the binaural audio system 120 to determine that the user of the computing device 104 is looking at, or in the direction of, the electronic content element (e.g., based on sensor data from a sensor configured to a field of view or a direction of an eye gaze of the user). In this example, the binaural audio application 140 causes the binaural audio system 120 to output the corresponding three-dimensional audio representation of the electronic content element in response to determining that the user is looking at, or toward, the electronic content element.

System Implementation Example

Figure 3:
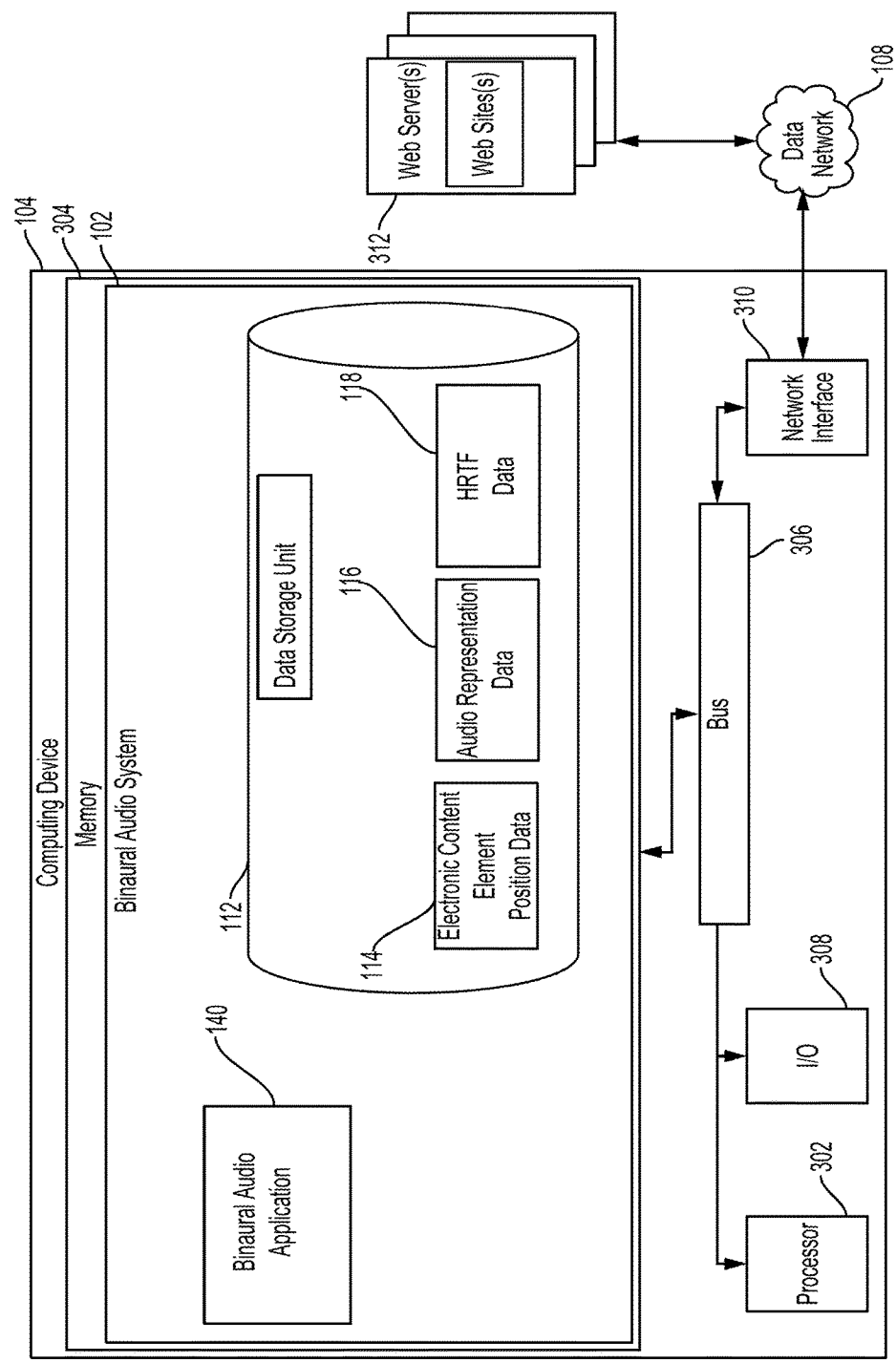
FIG. 3 is an example of a block diagram of a computing device that executes a binaural audio system to generate binaural and spatial audio representations of electronic content elements in accordance with one or more embodiments.

Any suitable computing system or group of computing systems can be used for performing the operations described herein. FIG. 3 is an example of a block diagram of a computing device that executes a binaural audio system 102 to perform the operations described herein.

The depicted example of the computing device 104 includes one or more processors 302 communicatively coupled to one or more memory devices 304. The processor 302 executes computer-executable program code stored in the memory device 304, accesses information stored in the memory device 304, or both. Examples of the processor 302 include a microprocessor, an application-specific integrated circuit ("ASIC"), a field-programmable gate array ("FPGA"), or any other suitable processing device. The processor 302 can include any number of processing devices, including one or more processors 302 that are configured by program code to implement the operations described above, such as the operations depicted in FIG. 2 that are described with respect to processing devices.

The memory device 304 includes any suitable non-transitory computer-readable medium for storing the binaural audio system 102. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. One or more memory devices 304 are used to implement the operations described above, such as the operations depicted in FIGS. 1-2 that are described with respect to one or more non-transitory computer-readable media.

The computing device 104 may also include a number of external or internal devices such as input or output devices. For example, the computing device 104 is shown with an input/output ("I/O") interface 308 that can receive input from input devices or provide output to output devices. A bus 306 can also be included in the computing device 104. The bus 306 can communicatively couple one or more components of the computing device 104. In some embodiments, the bus 306 is used to implement the operations described above with respect to FIGS. 1-2 that involve communicating signals via a data bus.

The computing device 104 executes program code that configures the processor 302 to perform one or more of the operations described above with respect to FIGS. 1-2. The program code includes, for example, binaural audio application 140 or other suitable applications that perform one or more operations described herein. The program code may be resident in the memory device 304 or any suitable computer-readable medium and may be executed by the processor 302 or any other suitable processor. In some embodiments, the program code described above is stored in the memory device 304, as depicted in FIG. 3. In additional or alternative embodiments, the program code described above is stored in one or more memory devices accessible via a data network.

The computing device 104 accesses the electronic content element position data 114, the audio representation data 116, or the HRTF data 118 in any suitable manner. In some embodiments, the electronic content element position data 114, the audio representation data 116, or the HRTF data 118 is stored in one or more memory devices accessible via a data network 108. In additional or alternative embodiments, some or all of the electronic content element position data 114, the audio representation data 116, or the HRTF data 118 is stored in the memory device 304.

The computing device 104 depicted in FIG. 3 also includes at least one network interface 310. The network interface 310 includes any device or group of devices suitable for establishing a wired or wireless data connection to one or more data networks 108. Non-limiting examples of the network interface 310 include an Ethernet network adapter, a modem, and/or the like. The computing device 104 is able to communicate with one or more web servers 312 via which a user may access the binaural audio system 102 or binaural audio application 140. In some embodiments, the network interface 310 is used to implement the operations described above with respect to FIGS. 1-2 that involve communicating signals via a data network.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method for spatially representing graphical interface elements as binaural audio content, the method comprising:
    accessing, by a processor, electronic content having a plurality of content elements;
    identifying, by the processor, the plurality of content elements of the electronic content;
    generating, by the processor, a three-dimensional audio representation for a content element of the plurality of content elements, wherein generating the three-dimensional audio representation comprises:
        accessing an audio representation of the content element;
        identifying a visual location of the content element by:
            accessing, by the processor, a content object model specifying visual locations of the plurality of content elements when displayed in a graphical interface; and
            identifying, by the processor and from the content object model, the visual location of the content element; and
        generating a three-dimensional audio representation of the content element by applying, to the audio representation of the content element and using the visual location, a finite impulse response filter using a head-related transfer function, wherein the head-related transfer function comprises a set of filter parameters that model the visual location of the content element and wherein, when played, the three-dimensional audio representation appears to originate from the visual location; and
    outputting, by the processor, the three-dimensional audio representation such that the three-dimensional audio representation is accessible to a user device that displays the electronic content.

2. The method of claim 1, wherein accessing the audio representation of the content element comprises:
    obtaining, by the processor, a textual representation of the content element; and
    converting, by the processor, the textual representation to the audio representation.

3. The method of claim 2, wherein converting the textual representation to the audio representation comprises converting, by the processor, the textual representation to the audio representation by using a text-to-speech engine to generate the audio representation from the textual representation.

4. The method of claim 1, wherein outputting the three-dimensional audio representation comprises:
    receiving, by the processor, user input to interact with the content element; and
    outputting, by the processor, the three-dimensional audio representation in response to receiving the user input.

5. The method of claim 1, wherein identifying the visual location of the content element comprises:
    determining, by the processor, an azimuth value of the content element; and
    determining, by the processor, an elevation value of the content element.

6. The method of claim 5, wherein generating the three-dimensional audio representation of the content element comprise:
    applying, to the audio representation of the content element and using the azimuth value and the elevation value, the finite impulse response filter using the head-related transfer function, wherein the set of filter parameters are based on the azimuth value and the elevation value.

7. A system comprising:
    a processing device; and
    a non-transitory computer-readable medium communicatively coupled to the processing device, wherein the processing device is configured to perform operations comprising:
        accessing electronic content having a plurality of content elements;
        identifying the plurality of content elements of the electronic content;
        generating a three-dimensional audio representation for a content element of the plurality of content elements, wherein generating the three-dimensional audio representation comprises:
            accessing an audio representation of the content element;
            identifying a visual location of the content element by:
                accessing a content object model specifying visual locations of the plurality of content elements when displayed in a graphical interface; and
                identifying the visual location of the content element from the content object model; and
            generating a three-dimensional audio representation of the content element by applying, to the audio representation of the content element and using the visual location, a finite impulse response filter using a head-related transfer function, wherein the head-related transfer function comprises a set of filter parameters that model the visual location of the content element and wherein, when played, the three-dimensional audio representation appears to originate from the visual location; and outputting the three-dimensional audio representation such that the three-dimensional audio representation is accessible to a user device that displays the electronic content.

8. The system of claim 7, wherein the processing device is further configured to access the audio representation of the content element by:

obtaining a textual representation of the content element; and converting the textual representation to the audio representation.

9. The system of claim 8, wherein the processing device is further configured to convert the textual representation to the audio representation by converting the textual representation to the audio representation by using a text-to-speech engine to generate the audio representation from the textual representation.

10. The system of claim 7, wherein the processing device is further configured to output the three-dimensional audio representation by:

receiving user input to interact with the content element; and outputting the three-dimensional audio representation in response to receiving the user input.

11. The system of claim 7, wherein the processing device is further configured to identify the visual location of the content element by:

determining an azimuth value of the content element; and
determining an elevation value of the content element.

12. The system of claim 11, wherein the processing device is further configured to generate the three-dimensional audio representation of the content element by applying, to the audio representation of the content element and using the azimuth value and the elevation value, the finite impulse response filter using the head-related transfer function, wherein the set of filter parameters are based on the azimuth value and the elevation value.

13. A system comprising:
a means for accessing electronic content having a plurality of content elements;
a means for identifying the plurality of content elements of the electronic content;
a means for generating a three-dimensional audio representation for a content element of the plurality of content elements, wherein generating the three-dimensional audio representation comprises:
accessing an audio representation of the content element;
identifying a visual location of the content element by:
accessing a content object model specifying visual locations of the plurality of content elements when displayed in a graphical interface; and
identifying the visual location of the content element from the content object model; and
generating a three-dimensional audio representation of the content element by applying, to the audio representation of the content element and using the visual location, a finite impulse response filter using a head-related transfer function, wherein the head-related transfer function comprises a set of filter parameters that model the visual location of the content element and wherein, when played, the three-dimensional audio representation appears to originate from the visual location; and
a means for outputting the three-dimensional audio representation such that the three-dimensional audio representation is accessible to a user device that displays the electronic content.

14. The system of claim 13, further comprising:
a means for accessing the audio representation of the content element by:
obtaining a textual representation of the content element; and
converting the textual representation to the audio representation.

15. The system of claim 14, further comprising a means for converting the textual representation to the audio representation by:
converting the textual representation to the audio representation using a text-to-speech engine to generate the audio representation from the textual representation.

16. The system of claim 14, further comprising a means for outputting the three-dimensional audio representation by:
receiving user input to interact with the content element; and
outputting the three-dimensional audio representation in response to receiving the user input.

17. The system of claim 14, further comprising a means for generating the three-dimensional audio representation of the content element by:
determining an azimuth value of the content element;
determining an elevation value of the content element; and
applying, to the audio representation of the content element and using the azimuth value and the elevation value, the finite impulse response filter using the head-related transfer function, wherein the set of filter parameters are based on the azimuth value and the elevation value.

* * * * *